United States Patent [19]

Yokouchi et al.

[11] Patent Number: 4,881,124
[45] Date of Patent: Nov. 14, 1989

[54] X-RAY TELEVISION APPARATUS

[75] Inventors: Hisatake Yokouchi, Tokyo; Fumitaka Takahashi; Masayuki Tsuneoka, both of Kashiwa, all of Japan

[73] Assignees: Hitachi, Ltd.; Hitachi Medical Corporation, both of Tokyo, Japan

[21] Appl. No.: 220,978

[22] Filed: Jul. 18, 1988

Related U.S. Application Data

[63] Continuation of Ser. No. 828,518, Feb. 12, 1986, abandoned.

[30] Foreign Application Priority Data

Feb. 25, 1985 [JP] Japan .................................. 60-34395

[51] Int. Cl.[4] ............................................. H05G 1/64
[52] U.S. Cl. ...................................... 358/111; 378/99
[58] Field of Search ........................... 358/111; 378/99

[56] References Cited

U.S. PATENT DOCUMENTS

| 4,204,225 | 5/1980 | Mistretta | 378/99 |
| 4,442,537 | 4/1984 | Haendle | 358/111 |
| 4,543,605 | 9/1985 | Verhoeven | 378/99 |
| 4,555,728 | 11/1985 | Fenster | 378/99 |

OTHER PUBLICATIONS

*REFERENCE DATA FOR RADIO ENGINEERS*, 4th Ed., 1957, p. 22.

Primary Examiner—Carolyn E. Fields
Assistant Examiner—David P. Porta
Attorney, Agent, or Firm—Antonelli, Terry & Wands

[57] ABSTRACT

An X-ray television apparatus in which an X-ray image which is obtained by an X-ray image intensifier is converted to an electrical signal by a television camera. This electrical signal is converted to a digital signal and stored into an image memory, and the angiographic imaging can be performed due to a differential process of data between two X-ray images. Either one of first, second, and third operating modes in which the scanning periods and the numbers of scanning lines of the television camera differ and a fourth operating mode to obtain the X-ray images by a further low X-ray dose and to simultaneously monitor the X-ray images can be selected. Thus, proper time resolution and spatial resolution according to a desired purpose can be obtained and the beam current of the image pickup tube of the television camera which is optimum in each operating mode is set.

9 Claims, 2 Drawing Sheets

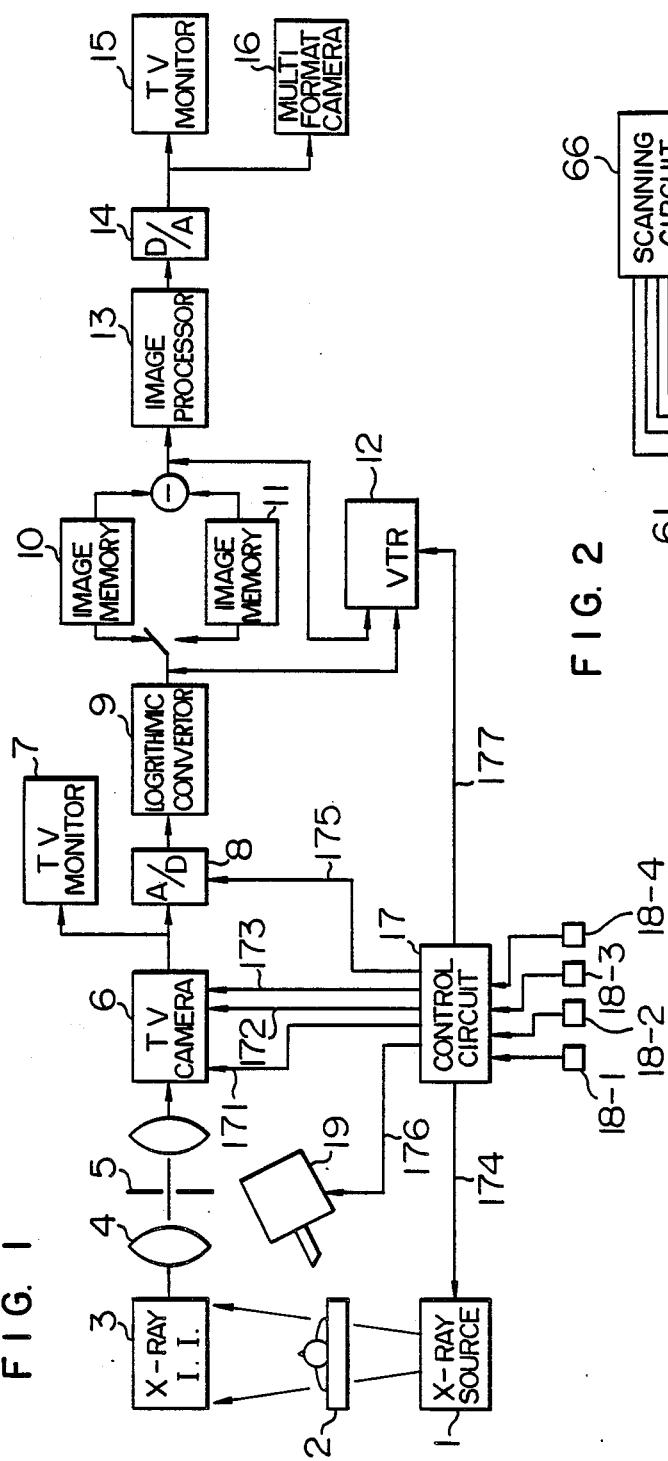
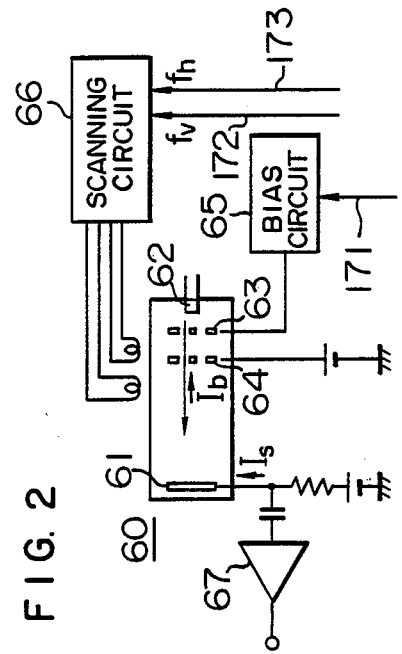

X-RAY TELEVISION APPARATUS

This application is a continuation of application Ser. No. 828,518, filed Feb. 12, 1986 now abandoned.

BACKGROUND OF THE INVENTION

The present invention relates to a medical X-ray diagnosis apparatus and, more particularly, to an apparatus of the type using a television camera for converting an X-ray image to an electrical signal.

In the field of X-ray diagnosis apparatuses, apparatuses for digitizing an image signal and processing this digital signal have been developed. Particularly, in angiography, arithmetic operations for subtracting an image from another image are needed and it is necessary to store the image signals which are sequentially obtained from the TV camera into a memory and process them; therefore, digitization of the signals is effective for this image process. Such an apparatus uses a constitution such that the conventional X-ray television apparatus, namely, the apparatus for displaying the X-ray image of the object on the TV screen on a real time basis is combined with the digital image processing apparatus including an image memory.

In this real-time display mode (hereinafter, simply referred to as the fluoroscopic mode), it is necessary to use a low X-ray dose because the X-ray is continuously irradiated to the object. In this case, a long time lag characteristic is required for an image pickup tube to make up for a decrease in S/N ratio of image caused by high X-ray quantum noise $\sigma_q$.

On one hand, to accumulate the image data into the image memory (hereinafter, simply referred to as the radiographic mode), the radiography of a high S/N ratio by use of a higher X-ray dose is desirable and a high time resolution or high spatial resolution is further required for the image pickup tube.

Moreover, in execution of the same radiography, a high resolution is required to observe, for example, fine blood vessels. On one hand, a high time resolution is required to observe the change in distribution of the contrast medium. As mentioned above, various characteristics are required for the X-ray television apparatus in dependence on a purpose of the observation and it is considered difficult to realize the apparatus which can satisfy wide application.

SUMMARY OF THE INVENTION

It is an object of the present invention to provide an X-ray television apparatus which can perform fluoroscopy or radiography of proper S/N ratio, time resolution, and spatial resolution in accordance with a purpose of observation.

Another object of the invention is to provide an X-ray television apparatus in which a scanning mode of a television camera is changed in accordance with a purpose of observation and a beam current of an image pickup tube can be set to a proper value on the basis of the change of the scanning mode.

Still another object of the invention is to provide an X-ray television apparatus which can avoid complication of the apparatus for the digitizing process portion irrespective of the change of the scanning mode of the television camera according to a purpose of observation.

It is one characteristic constitution of the invention that in an apparatus including an X-ray image intensifier, a television camera using a photoconduction type image pickup tube, and image processing means for digitizing an image signal of a TV camera and processing this digitized image signal, there is provided operating mode selecting means for selectively setting the number of scanning lines and the scan period of the TV camera and switching a beam current of the image pickup tube in accordance with a change of the maximum signal current of the image pickup tube in association with that selective setting.

It is another characteristic constitution of the invention that in an apparatus including an X-ray image intensifier, a TV camera using a photoconduction type image pickup tube, display means for simultaneously monitoring an image signal of the TV camera, and image processing means for digitizing the image signal and processing this digitized image signal, there is provided operating mode selecting means for selectively setting a first operating mode to monitor the image signal of the TV camera by the display apparatus or a second operating mode to store the image signal into a memory of the image processing means and for reducing an X-ray dose and setting a beam current of the image pickup tube to a lower value in the first operating mode as compared with those in the second operating mode.

BRIEF DESCRIPTION OF THE DRAWINGS

FIG. 1 is a block diagram of an embodiment of the present invention;

FIG. 2 is a detailed block diagram of a block 6 in FIG. 1;

DESCRIPTION OF THE PREFERRED EMBODIMENT

Figure 3:
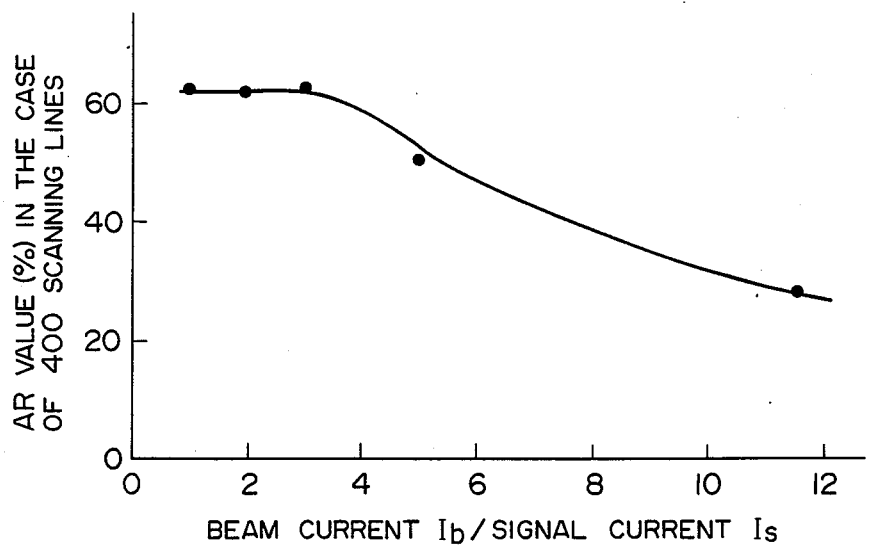
FIG. 3 is a characteristic diagram showing an amplitude response of an image pickup tube.

FIG. 1 shows an embodiment of the present invention and is an arrangement diagram in the case where the invention is applied to a digital fluoroscopic angiography apparatus.

An X-ray generated from an X-ray source 1 passes through an object 2 and enters an X-ray image intensifier (X-ray II) 3. The X-ray information is converted to light information by the X-ray II. This light information passes through a tandem lens 4 and a movable optical diaphragm 5 and is converted to an electrical signal by a television camera 6. A video signal from the TV camera 6 is displayed by a TV monitor 7 and at the same time, it is converted to a digital signal by an A/D converter 8. This digital signal is then converted to density information by a logarithmic converter 9. A contrast medium injector 19 is used to inject a contrast medium into a vein of the object 2. X-ray images of a region of interest in the object 2 which are obtained before the contrast medium reaches this region, namely, what are called mask images are stored into an image memory 10. X-ray images of the region of interest which are obtained after the contrast medium reaches and fills in this region until it flows out of this region, namely, what are called live images are stored into an image memory 11. A difference signal between both signals which are read out from the image memories 10 and 11 is obtained. This difference signal is then subjected to image processes such as an image emphasis, a gamma conversion, and the like by an image processor 13. An output signal from the image processor 13 is converted to an analog signal by a D/A converter 14 and then displayed by a TV monitor 15. An output of the logarithmic converter 9 or the difference signal is recorded by a VTR 12 as necessary.

In addition, a hard copy of blood vessel images is obtained using a multi format camera 16 as necessary.

The operating mode can be set by a control circuit 17 in accordance with the case of obtaining the real-time fluoroscopic images by the TV monitor 7 or the case of obtaining angiographic images and, in the latter case, in accordance with the region of interest such as a brain, a heart, or the like. One of those operating modes is selected due to the operations of mode selection switches 18-1, 18-2, 18-3, and 18-4. Reference numeral 171 denotes a control signal to specify the beam current of the image pickup tube of the TV camera 6, 172 is a vertical sync signal of the image pickup tube, 173 a horizontal sync signal, and 174 a control signal to specify an X-ray dose of the X-ray source 1. A beam current $I_b$, a horizontal synchronizing frequency $f_h$, a vertical synchronizing frequency $f_v$, and an X-ray dose R which are indicated by those signals 171 to 174 are respectively set to proper values in dependence on the operating modes I, II, III, and IV as will be shown hereinafter. Reference numeral 175 denotes a sampling clock of the A/D converter 8, 176 is a control signal to control the injector 19, and 177 is a control signal to control the VTR 12.

FIG. 2 shows a detailed diagram of the TV camera 6. An image pickup tube 60 is of the photoconduction type image pickup tube (e.g., SATICON tube) and charges in accordance with an amount of light are accumulated in the photoelectric converting surface of an anode 61. The beam current $I_b$ of an electron beam from an electron beam source 62 is controlled by a bias voltage which is applied to a beam control electrode 63. Numeral 64 denotes a beam acceleration electrode. A bias circuit 65 generates a bias voltage such as to become a beam current which is designated by the control signal 171 from the control circuit 17. A scanning circuit 66 generates sawtooth deflection signals synchronized with the vertical synchronizing signal 172 and horizontal synchronizing signal 173 which are supplied from the control circuit 17, thereby performing the two-dimensional scan of the beam position. The AC component of a signal current $I_s$ which is obtained from the anode 61 is converted to a voltage signal by a preamplifier 67 and becomes an image signal. In this way, the scanning mode of the TV camera 6 and the beam current of the image pickup tube are designated by the control signals from the control circuit 17 in accordance with the operating mode.

Table 1 shows the details of four operating modes which are set in the control circuit 17.

ating mode I, the number of radiographic images per unit time is reduced and a high spatial resolution is attained. The number of scanning lines of the image pickup tube of the TV camera is 1050 and the number of radiographic images per second is 7.5. To realize this scan, the vertical synchronizing frequency $f_v$ of the TV camera is 7.5 Hz and the horizontal synchronizing frequency $f_h$ is 7.875 kHz. The vertical sync signal 172 and horizontal sync signal 173 which are supplied to the TV camera 6 from the control circuit 17 have those frequencies, respectively. The number of pixels of one picture plane which are stored in the image memory 10 or 11 is 1024×1024, so that the frequency of the sampling pulse 175 to drive the A/D converter 6 is about 10 MHz.

In the operating mode II, the number of radiographic images per second is increased to thirty and the spatial resolution is slightly decreased. The number of scanning lines is 525, $f_v$ and $f_h$ are 30 Hz and 15.75 kHz, respectively, number of pixels is 512×512. As can be seen in Table 1, for operating mode II the value for the number of scanning lines (525) is equal to $\frac{1}{2}$ of the value of the number of scanning lines (1050) for operating Mode I or a relationship of $1/n$ exists wherein n=2. Similarly for the values for $f_v$ (30) for operating Mode II and $f_v$ (7.5) for operating Mode I a relationship of $N^2$ exists. For $f_h$ (15.75) in operating Mode II and $f_h$ (7.875) in operating Mode I a relationship of n exists and for the number of pixels (512×512) in operating Mode II and the number of pixels (1024×1024) in operating Mode I a relationship of $1/n^2$ exists.

In the operating mode III, the number of radiographic images per second is further increased to sixty and the spatial resolution is further reduced. The number of scanning lines is 525 per frame. However, different from the operating modes I and II, the interlacing scan is performed in the operating mode III, so that the number of scanning lines per field is about half of that in the operating mode I or II. $f_v$ and $f_h$ are 60 Hz and 15.75 kHz, respectively. The number of pixels is 256×256.

The signal current $I_s$ of the image pickup tube of the TV camera 6 is proportional to charge amount Q accumulated at the photoelectric converting surface between a scanning period and to the scanning speed. In the operating mode I, the scanning period is four times as large as that in the mode II and area of a pixel is as small as a quarter of that in the mode II. However, the accumulated charge amount Q per pixel is not equal but smaller than that in the mode II due to the saturation of the conversion characteristic of the photoelectric converting surface. The scanning speed per pixel is the same speed as that in the mode II, so that the maximum signal current $I_{smax}$ is smaller than that in the mode II.

TABLE 1

| | Number of scanning lines | $f_v$ (Hz) | $f_h$ (kHz) | Pixel matrix size | $I_{smax}$ (μA) | $I_b$ (μA) | R (μR) |
|---|---|---|---|---|---|---|---|
| MODE I | 1050 | 7.5 | 7.875 | 1024 × 1024 | 500 | 700 | 1000 |
| MODE II | 525 | 30 | 15.75 | 512 × 512 | 1000 | 1200 | 1000 |
| MODE III | 525 | 60 | 15.75 | 256 × 256 | 1000 | 1200 | 1000 |
| MODE IV | 525 | 60 | 15.75 | — | 50 | 75 | 1 |

The operating modes I to III are the radiographic modes in which the image signal of the TV camera 6 is A/D converted and stored in the image memory 10 or 11. The X-ray dose R from the X-ray source 1 is 1000 μR on the sensor surface of the X-ray II 3. In the oper- In this embodiment, $I_{smax}$ was 500 μA in the mode I and 1000 μA in the mode II. In the mode III, the charge amount and the scanning speed per pixel are the same as those in mode II, because of the interlace scanning, so that $I_{smax}$ was 1000 μA.

It is necessary to properly set a value of the beam current $I_b$ in response to the change of the maximum signal current $I_{smax}$ depending on the operating mode. FIG. 3 shows the values of the amplitude response (AR) of the image pickup tube to the ratio between the beam current $I_b$ of the image pickup tube and the signal current $I_s$. As will be understood from this graph, the AR is influenced by $I_b$ and it is desirable to use the image pickup tube at a ratio of $I_b/I_s<3$, i.e., the maximum current $I_b$ is less than three times as large as the current $I_{smax}$.

Therefore, in this embodiment, $I_b$ was set to 700 μA in the operating mode I and $I_b$ was set to 1200 μA in the operating modes II and III in correspondence to the value of the maximum signal current $I_{smax}$ in each operating mode.

Since the value of the signal current $I_s$ also largely relates to the S/N ratio, there is also the case where it is necessary to control, for example, the movable optical diaphragm 5 in accordance with the operating mode so that $I_s$ becomes a proper value responsive to the operating mode.

In the operating modes I, II, and III, even if the numbers of pixels which are stored into the image memories 10 and 11 differ, the scanning periods of the image pickup tube also differ in dependence on those different number of pixels. Thus, the frequency of the sampling clock 175 which is supplied to the A/D converter 8 always becomes constant (about 10 MHz). With such a constitution, it is possible to prevent that the constitution of the digital image processing section including the image memories 10 and 11 becomes complicated due to the use of the operating mode switching mechanism.

As compared with the radiographic modes I, II, and III mentioned above, in the operating mode IV, the A/D converter 8 is made inoperative but the X-ray images are simultaneously monitored by the TV monitor 7. Namely, the operating mode IV is the fluoroscopic mode. The number of scanning lines, the vertical synchronizing frequency $f_v$, and the horizontal synchronizing frequency $f_h$ are 525, 60 Hz, and 15.75 kHz, respectively, similarly to those in the mode III. The interlacing scan is also performed similarly to the mode III. In this fluoroscopic mode, an X-ray is continuously irradiated onto the object 2; therefore, it is necessary to set the X-ray dose R as small as possible. In the case of the embodiment, the X-ray dose R was set to 1 μR on the sensor surface of the X-ray II 3. Namely, the X-ray irradiation intensity of the X-ray source 1 is set to be low by the control signal 174 from the control circuit 17. Thus, the maximum signal current $I_{smax}$ of the image pickup tube of the TV camera 6 became 50 μA.

With such a low X-ray dose, a long time lag is needed for the image pickup tube to prevent the X-ray quantum noise and the deterioration of the S/N ratio of the image. In this embodiment, the long time lag is realized due to the radiographic condition of the TV camera 6.

Figure 4:
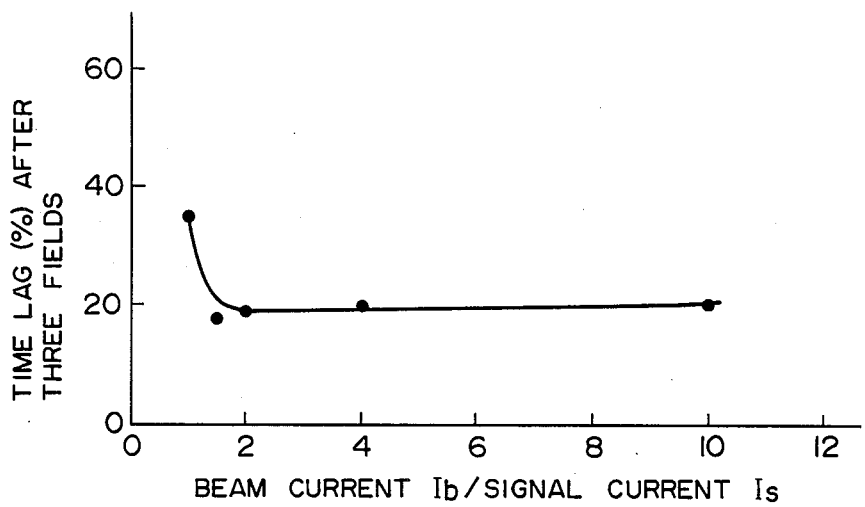
FIG. 4 is a characteristic diagram showing a time lag of the image pickup tube.

FIG. 4 shows the relation between the time lag (change ratio of the value of $I_s$ after three fields) and $I_b$ when the illumination intensity of the TV camera 6 is low. As will be understood from this graph, it is desirable to set to $I_b/I_s<1.5$ to elongate the time lag of the image pickup tube in order to improve the S/N ratio upon fluoroscopy.

Therefore, in this embodiment, the beam current $I_b$ in the mode IV was set to 75 μA in correspondence to the value of $I_{smax}$.

In the embodiment, the TV monitor 7 is made operative in the modes I, II, and III as well, thereby also making it possible to monitor the X-ray images in a real-time manner which are sequentially stored into the image memory 10 or 11.

As described above, in the embodiment, the scanning mode of the TV camera is changed in accordance with the purpose of observation and the proper beam current of the image pickup tube is set in correspondence to the scanning mode, thereby obtaining desired spatial resolution and time resolution.

Further, by setting the X-ray dose according to the fluoroscopic mode and radiographic mode, respectively, the beam current of the image pickup tube is properly set in accordance with the X-ray dose set.

We claim:

1. An X-ray television apparatus comprising:
  image intensifier means for intensifying an X-ray image of an object and converting said X-ray image to a visible image;
  television camera means for enabling production of said visible image using a photoconduction type image pickup tube, said image pickup tube including an electron beam which is scanned horizontally and vertically to provide a plurality of scanning lines;
  A/D converter means for A/D converting an image signal from said television camera means;
  image processing means for storing said image signal and processing said image signal on the basis of data stored in said image processing means;
  mode selecting switch means for selecting one mode from a plurality of operating modes, each of said operating modes having a different number of pixels for an image and a different number of scanning lines for said television camera means; and
  control means for controlling the horizontal synchronizing frequency and the vertical synchronizing frequency for scanning said television camera means in accordance with an output of said mode selecting switch means such that a converting period of said A/D converter means becomes constant irrespective of said operating mode.

2. An X-ray television apparatus according to claim 1, wherein said control means sets a beam current of said image pickup tube in response to a change in maximum signal current of the image pickup tube in association with mode selection by said mode selecting switch means.

3. An X-ray television apparatus according to claim 1, wherein said control means controls the horizontal scanning frequency and the vertical scanning frequency of said television camera means such that a scanning period of said television camera means is longer in a first operating mode which has a larger number of pixels for an image and a larger number of scanning lines for said television camera means than that of a second operating mode which has a smaller number of pixels for an image and a smaller number of scanning lines for said television camera means.

4. An X-ray television apparatus comprising:
  image intensifier means for intensifying an X-ray image of an object obtained by irradiation of an X-ray beam to the object and converting said X-ray image to a visible image;
  television camera means for enabling production of said visible image using a photoconduction type image pickup tube, said image pickup tube including an electron beam which is scanned horizontally and vertically to provide a plurality of scanning lines;

A/D converter means for A/D converting an image signal from said television camera means;

image processing means for storing said image signal and processing said image signal on the basis of data stored in said image processing means;

mode selecting switch means for selecting one mode from a plurality of operating modes including a first operating mode having a predetermined number of pixels for an image and a predetermined number of scanning lines for said television camera means, and a second operating mode having a number of pixels $1/n^2$ times as large as that of said first operating mode and a number of scanning lines $1/n$ times as large as that of said first operating mode, n being an integer;

control means for controlling the horizontal synchronizing frequency and the vertical synchronizing frequency for scanning said television camera means in accordance with an output of said mode selecting switch means such that the vertical synchronizing frequency in said second operating mode becomes $n^2$ times as large as that in said first operating mode and that the horizontal synchronizing frequency in said second operating mode becomes n times as large as that in said first operating mode so that a converting period of said A/D converter means becomes constant through said first and second operation mode.

5. An X-ray television apparatus according to claim 4, wherein said control means sets a beam current of said image pickup tube in accordance with the output of said mode selecting switch means so that the setting value of the beam current in the first operating mode is larger than that in the second operating mode.

6. An X-ray television apparatus according to claim 5, wherein said plurality of operating modes further include a third operating mode in which the X-ray dose is smaller than that in said first and second operating mode and in which a ratio of a beam current and a maximum signal current of said image pickup tube is smaller than 1.5.

7. An X-ray television apparatus according to claim 4, wherein said number of pixels of said second operating mode is ¼ times as large as that of said first operating mode, said number of scanning lines of said second operating mode is ½ times as large as that of said first operating mode, said vertical synchronizing frequency of said second operating mode becomes 4 times as large as that in said first operating mode and said horizontal frequency in said second operating mode becomes 2 times as large as that in said first operating mode.

8. An X-ray television apparatus comprising
image intensifier means for intensifying an X-ray image of an object and converting said X-ray image to a visible image;
television camera means for enabling production of said visible image using a photoconduction type image pickup tube, said image pickup tube including an electron beam which is scanned horizontally and vertically to provide a plurality of scanning lines;

A/D converter means for A/D converting an image signal from said television camera means;

image processing means for storing said image signal and processing said image signal on the basis of data stored in said image processing means;

mode selecting switch means for selecting one mode from a plurality of operating modes, including operating modes having a different number of pixels for an image and a different number of scanning lines for said television camera means; and control means for controlling the horizontal synchronizing frequency and the vertical synchronizing frequency for scanning said television camera means in accordance with an output of said mode selecting switch means and for setting a beam current of said image pickup tube in accordance with the output of said mode selecting switch means, the setting value of the beam current for each operating mode being determined by a maximum charge amount on photoelectric converting surface of said television camera means per pixel between a scanning period of said television camera means in each operating mode.

9. An X-ray television apparatus comprising:
image intensifier means for intensifying an X-ray image of an object obtained by irradiation of an X-ray beam to the object and converting said X-ray image to a visible image;
television camera means for enabling production of said visible image using a photoconduction type image pickup tube said image pickup tube including an electron beam which is scanned horizontally and vertically to provide a plurality of scanning lines;

A/D converter means for A/D converting an image signal from said television camera means;

image processing means for storing said image signal and processing said image signal on the basis of data stored in said image processing means;

mode selecting switch means for selecting one mode from a plurality of operating modes including a first operating mode having a predetermined number of pixels for an image and a predetermined number of scanning lines for said television camera, and a second operating mode having a number of pixels ¼ times as large as that of said first operating mode and a number of scanning lines ½ times as large as that of said first operating mode;

control means for controlling the horizontal synchronizing frequency and the vertical synchronizing frequency for scanning said television camera means in accordance with an output of said mode selecting switch means such that the vertical synchronizing frequency in said second operating mode becomes 4 times as large as that in said first operating mode and that the horizontal synchronizing frequency in said second operating mode becomes two times as large as that in said first operating mode so that a converting period of said A/D converter means becomes constant through said first and second operation mode.

* * * * *